UNITED STATES PATENT OFFICE.

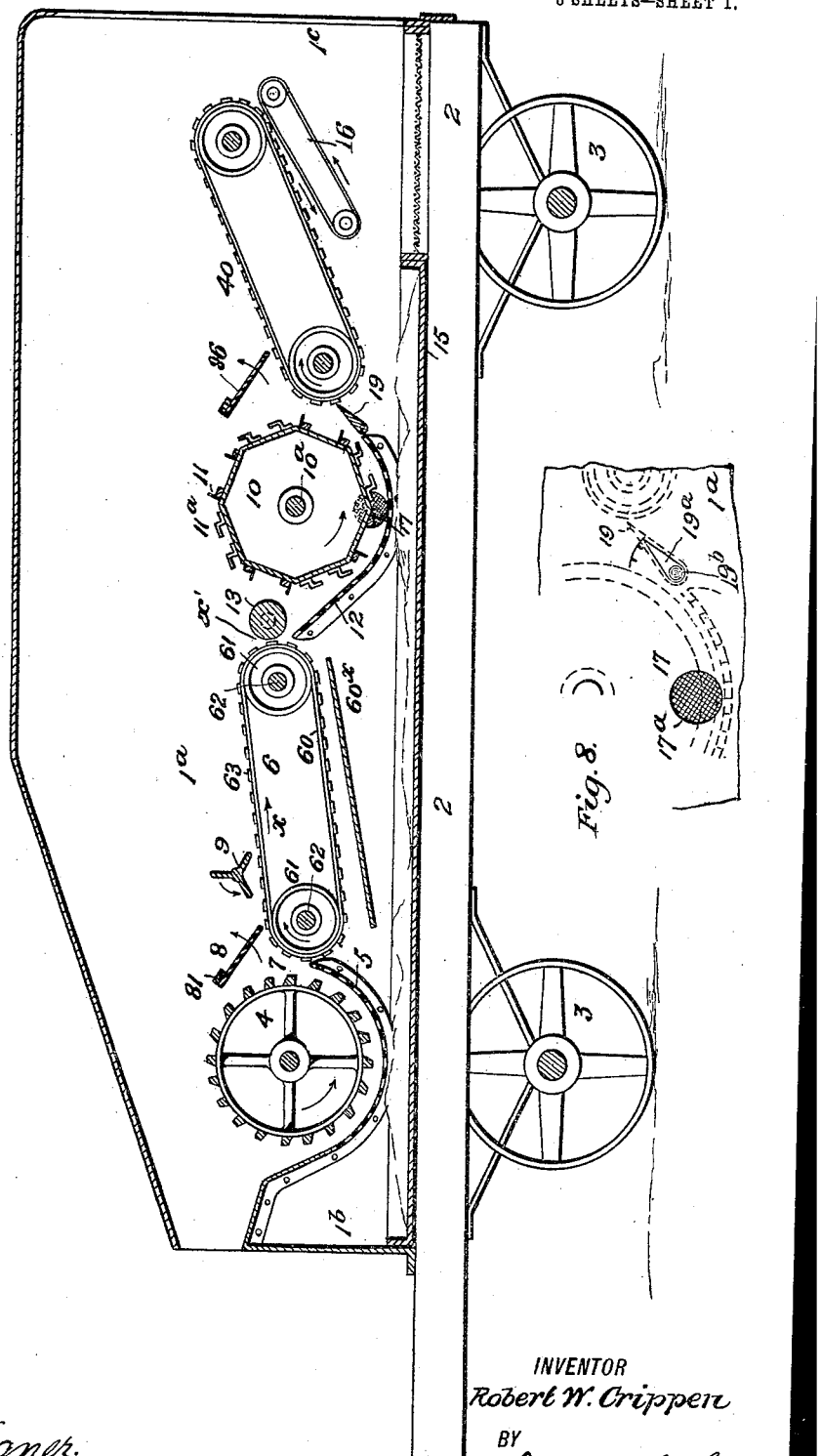

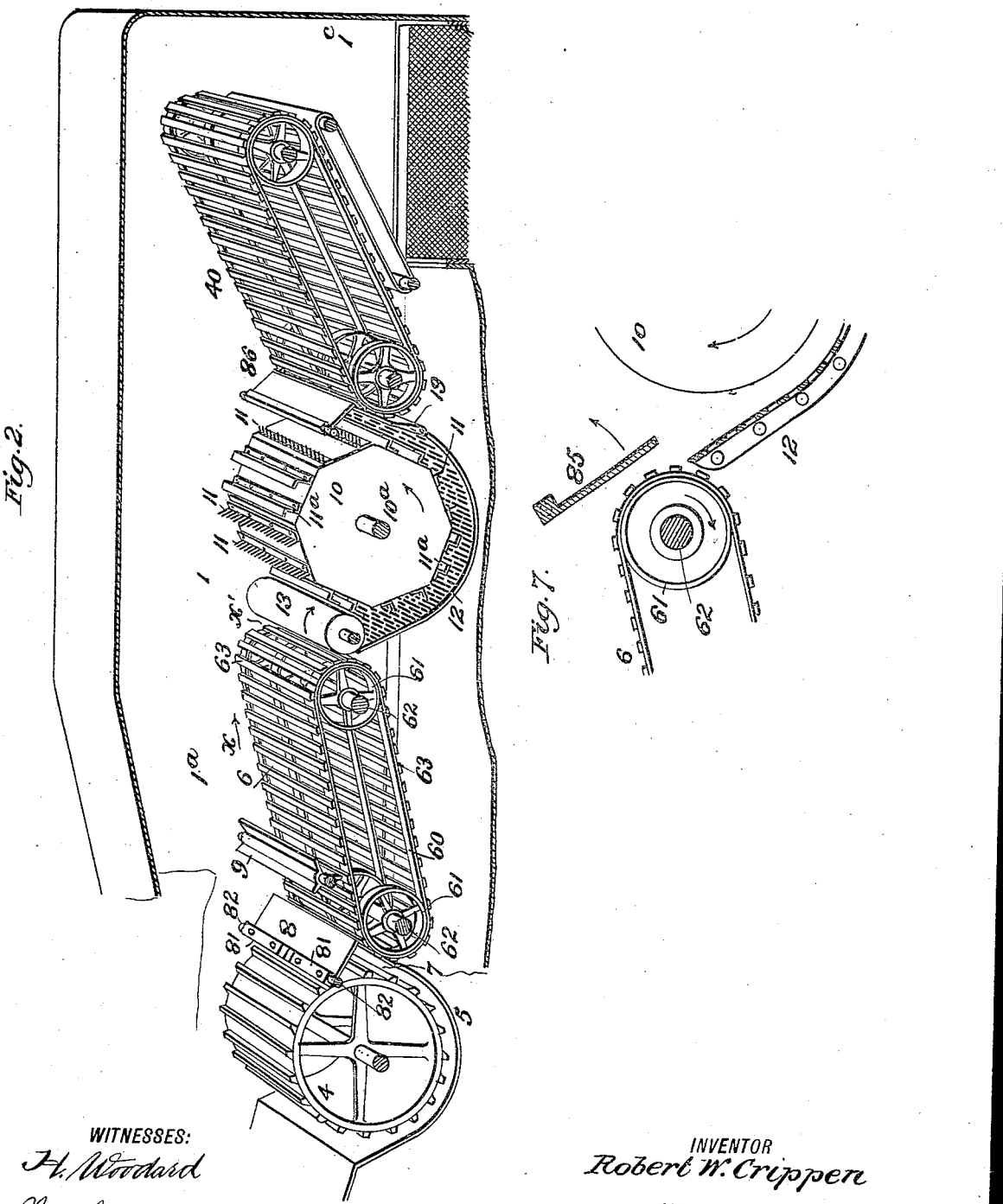

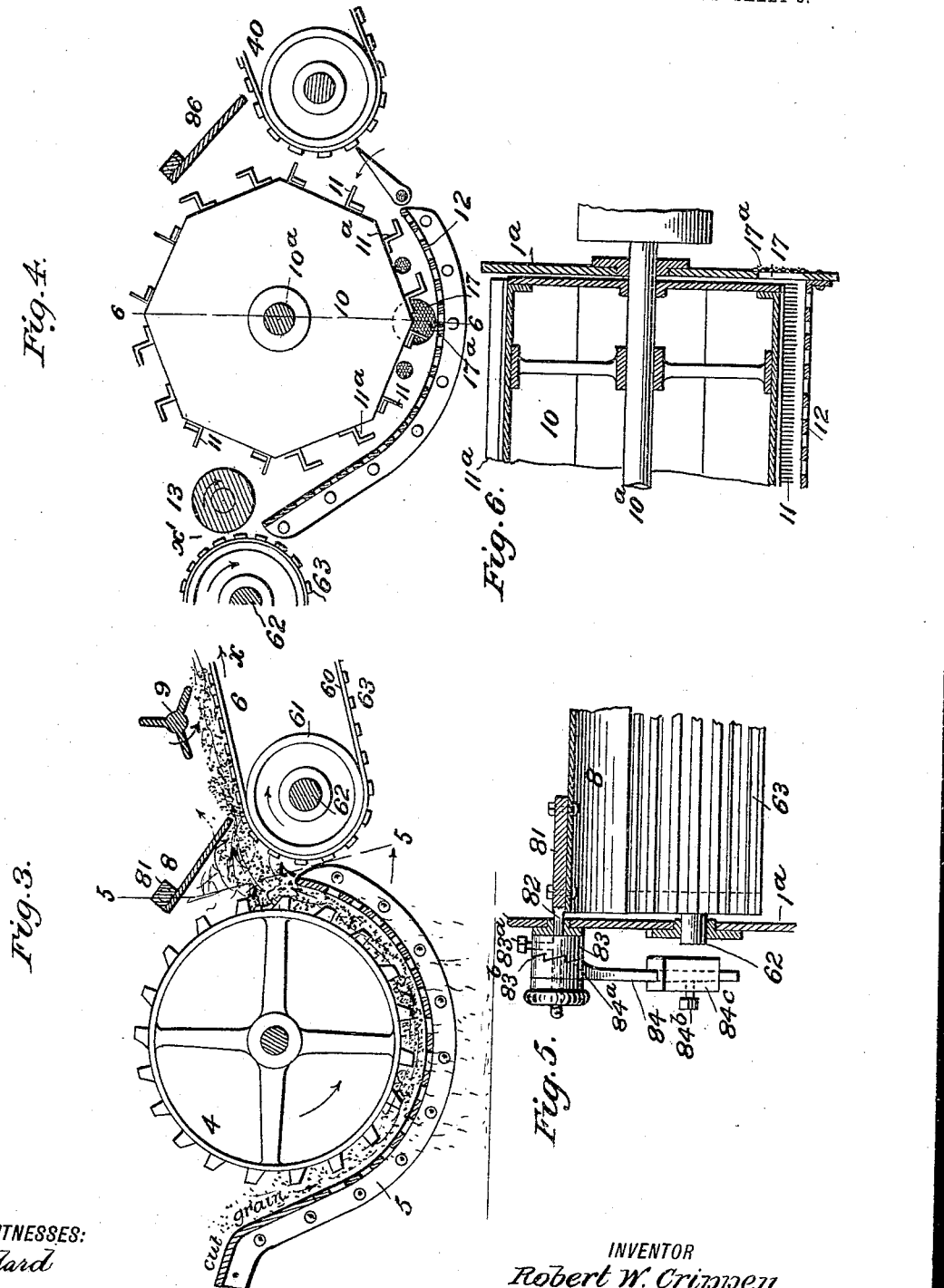

ROBERT WHITNEY CRIPPEN, OF ARLINGTON, KANSAS.

THRESHING-MACHINE.

931,731.  Specification of Letters Patent.  Patented Aug. 24, 1909.

Application filed May 11, 1908. Serial No. 432,118.

*To all whom it may concern:*

Be it known that I, ROBERT WHITNEY CRIPPEN, residing at Arlington, in the county of Reno and State of Kansas, have invented certain new and useful Improvements in Threshing-Machines, of which the following is a specification.

My invention relates to certain improvements in threshing machines that have for their object to provide for the separation of the straw chaff and other extraneous matter from the grain kernels in a quick, positive and economical manner, and for preventing the said separations from falling into the grain pan.

With the above objects in view, my invention comprises certain improved devices that coöperate with the threshing cylinder, in the nature of a pair of endless aprons disposed in the like longitudinal plane, a drum located between the aprons, an adjustable guard or beater devices located at the discharge throat from the cylinder and between the discharge end of the first one of the aprons and the drum, a grated concave that coöperates with the drum and the gage or beater and the final or discharging apron, the several parts being relatively so arranged and combined whereby to provide for conveying the straw through the machine at a high speed, for example, at the rate of two hundred and fifty feet per minute and in which the parts are especially mounted so they have little or no lateral vibration.

In its more subordinate nature, my invention embodies certain details of construction and peculiar arrangement of the several parts, especially those that constitute the drum and the gage or beater members located at the entrant portion of the drum, all of which will be hereinafter fully described, specifically pointed out in the appended claims and illustrated in the accompanying drawings, in which:—

Figure 1, is a longitudinal section of a machine embodying my invention. Fig. 2, is a diagrammatic perspective view of the several coöperating parts that form the essential features of my invention. Fig. 3, is a detail longitudinal section of the receiving end of the machine. Fig. 4, is a similar view illustrating parts at the central portion of the machine. Fig. 5, is a cross section thereof on the line 5—5 on Fig. 3. Fig. 6, is a similar view on the line 6—6 on Fig. 4. Fig. 7, is a view of a modified form of my invention hereinafter referred to. Fig. 8, is a detail view hereinafter referred to.

In the drawings, I have illustrated so much of the complete machine as is necessary to disclose an operative relation of the parts that constitute my invention and in the said drawings, 1 designates the main casing formed by the sides $1^a$—$1^a$ and the front and rear ends $1^b$—$1^c$, supported on the longitudinal truck frame beams 2—2 mounted in the wheels 3—3 as shown.

At the infeed end of the casing is mounted the threshing cylinder 4, of any approved construction, preferably a twenty bar cylinder, that operates over the usual form of concave 5.

6 designates what I shall hereinafter term the first endless apron or straw carrier, that is composed of a series of endless flexible bands 60, that take over band pulleys 61—61 mounted on the shafts 62—62, parallel with the cylinder 4 and a series of transverse slats 63 that are fastened to the bands 60, the shafts 62 being geared or belted with the driving mechanism of the machine, in any approved manner, so as to impart motion in the direction of the arrow $x$.

The straw carrier 6 has a slight upward incline from the front end, and the said end is held in close proximity to the discharge or throat 7 formed between the cylinder 4 and the concave 5, see Fig. 1, and the said throat 7 is disposed substantially in the horizotal plane of the axis of the cylinder and the axis of the adjacent shaft 62, such relation of parts being provided so that the material as it leaves the cylinder passes instantly onto the carrier 6 to be continued thereover without impediment in its swift forward course.

For preventing the material as it leaves the throat 7 from being thrown up by centrifugal force and for positively directing the same into contact with the rapidly forwardly moving carrier 6, a beater or gage device is mounted at the said discharge throat 7 and the said device is adjustably mounted for adapting it for different desired positioning with respect to the cylinder and the first incline or carrier. The said beater or gage device indicated, generally by 8, embodies a flat plate that extends the full width of the casing between the machine sides $1^a$—$1^a$ and to this plate, near the upper edge on one face thereof are secured a pair of flat members 81—81, the ends of which are reduced to form pintles 82—82 that project through the casing sides 1ª—1ª, as clearly shown in Fig. 5 by reference to which it will be seen that the projected ends of the pintles 82 carry collars 83—83 fixedly held on the pintles by the set screws 83ª and that have ratchet faces 83ᵇ for coacting with the ratchet faces 84ª on the hub ends 84ᵇ of the weight holding arms 84, that carry the slidable weights 84ᶜ clamped on the arms 84 by the set screws 84ᵇ.

By constructing the beater or gage member 8 in the manner shown and described, it can be readily mounted on the casing for use and the weighted arms fit on the pintles 82 to such position and to effect the desired counterweight against the force of the material as it is being thrown out from the cylinder and concave.

By providing an adjustable device of the character stated, the desired resistance or check on the out throw of the straw as it leaves the throat 7 is provided for, and the varying degree of force and travel of the material is automatically taken care of by the counterweighted baffle or gage plate 8.

Another and important advantage in placing the gage member 8 as indicated is that by reason of the impact of the material thereagainst, a considerable separation of the grain from the straw is effected, which drops down either between the concave and the front end of the apron carrier 6 or back into the grain pan.

For further providing for a separation of the grain from the straw a supplemental beater 9 is combined with apron carrier 6, it being mounted thereover near the beater 8, and the said beater 9 is of a radial blade kind and driven to rotate in the direction of the arrow on Fig. 1 for aiding the quick forward travel of the material, it being understood that the grain separations that occur during the transit of the material over the straw carrier 6 drop through the said carrier 6 either directly into the grain pan or onto a deflector board 60ˣ, see Fig. 1.

Coöperating with the carrier 6 is a feeding drum, the specific construction of which and its combination with the first and second aprons presently again referred to forms an essential feature of this invention.

The feeding drum, which is designated 10 is located in advance of the delivery end of the carrier 6 and it is mounted in the shaft 10ª transversely mounted in the casing and geared with the driving mechanism, in any suitable manner to be rotated at a high speed. This drum in cross section, is of polygonal shape to prevent the straw from wrapping around the same and it has a number of transversely disposed series of projected rake teeth 11 and a series of transversely disposed angle cleats 11ª, an angle of which projects toward the teeth, the said cleats and teeth, together with the grate member 12 that coöperates with the drum, serving to clear the drum teeth of straw chaff, and at the same time effecting the last but positive clearance of the grain from the chaff, straw, etc. as it passes over the grate like concave.

The grate member 12 is in the nature of a concave, it passing under the drum and in practice, is disposed about 5 inches away therefrom.

The axis of the drum 10 is disposed in the horizontal plane of the cylinder axis and the receiving end of the concaved grate 12 extends upwardly beyond the axis of the said drum to a point near the delivery end of the carrier 6 and in close proximity to the apron, as clearly shown in Fig. 1.

At the delivery end of the carrier 6 is mounted a supplemental feed roller 13 so located that its axis is disposed in a plane slightly above the axis of the upper shaft of the carrier 6, the said roller 13 being also so mounted that its delivery face discharges the material onto the drum 10, the rake teeth of which just clear the roller 13.

In practice, the roller 13 is about six inches in diameter while the pulleys for the apron bands are about ten inches in diameter, and by reason of such relative sizes of the pulleys and the roller 13, and the manner in which they are coöperatively mounted, the receiving face of the roller 13 is in a plane below the discharge end of the carrier 6, and thereby provides, as it were, a pocket $x'$ for temporarily receiving the material as it passes from the carrier 6 and to cause it in its transit to bunch sufficiently at this point to cause the roller 13 and the drum 10 to positively force the material onto the receiving end of the concave 12, it being obvious that the roller 13, the drum with its teeth, and angle plates in engaging the material, effect a further separation of the grain therefrom, the bulk of which passes through the grated concave into the grain pan.

Instead of using the roller 13, a drop gage plate 85 might be used instead, as shown in the modified form of my invention, see Fig. 7 but I prefer to use the roller 13.

To separate such of the grain that may pass through the concave 12 with the straw, the discharge end of the said concave is located at a point below the axis of the drum 10, and in close proximity to the lower or receiving end of a second endless apron or straw carrier 40, constructed similarly to the carrier 6 but held at a greater incline so as to cause the separation of the remaining grain from the straw while passing over the carrier, and to regulate the passage of the material over the concave, one or more wind boards 19 are located in the throat or passage from under the drum, said boards having pintles that extend through the casing sides provided with indicators 19ª see Fig. 8 and clamp screws 19ᵇ for setting the boards to the position desired, in Fig. 1.

The straw and trash that passes from the second carrier 40 may be taken up by screening sieves or led to shaking means if desired.

To deflect the grain that drops through carrier 40 back into the pan 15 an inclined endless apron 16 is mounted under the upper end of the said carrier 40, as clearly shown in Fig. 1.

To facilitate the forward passage of the material, blast openings 17 are made in the casing sides directly under the drum 10 and above the concave, and these openings are closed by a fine screen 17ª to prevent the grain from being blown out therethrough as it passes from the concave 12 and to positively deflect the same back onto the carrier 40, a gage or beater device 86 is mounted over the receiving end of the carrier 40 as shown, the said beater or gage 86 being constructed and operated like the beater or gage device 8 at the receiving end of the apron 6.

By reason of the arrangement of the parts as described and shown, I have provided a means for continuously moving the straw, etc., at a high speed, since the drum 10, in practice, is revolved at a very high speed, sufficient to take up the material as fast as it is fed along by the rake 6, the engagement of the material with the several beater devices, the guide roll, the two carriers 6 and 40 and with the concave, effecting a maximum separation of the grain from the straw chaff and other trash, and so completely as to leave the straw etc. practically in a shape to be carried off to the stacker.

Having thus described my invention, what I claim and desire to secure by Letters Patent, is:—

1. The combination of the inclined straw carriers, a drum located between the said carriers, said drum having transverse series of radially projected rake teeth, and a series of angle flanges, the series of angle flanges alternating with the rake teeth, a grated concave that coöperates with the drum and which has its discharge end arranged to deliver on to the receiving end of one of the carriers, the receiving end of the said concave being disposed adjacent the discharge end of the other carrier, and a means between the apron and the frame for temporarily checking the movement of the material as it passes from the carrier to the drum.

2. The combination with the inclined straw carriers, a drum located between said carriers, said drum having transverse series of radially projected rake teeth and a series of angle flanges, the series of angle flanges alternating with the series of rake teeth, and a grated concave that coöperates with the drum and which has its discharge end arranged to deliver onto the receiving end of one of the carriers, the receiving end of the said concave being disposed adjacent the discharging end of the other carrier, as set forth.

ROBERT WHITNEY CRIPPEN.

Witnesses:
O. W. LEYMAN,
W. H. CRIPPEN.